(12) United States Patent
Chapin et al.

(10) Patent No.: US 11,890,935 B2
(45) Date of Patent: Feb. 6, 2024

(54) VEHICULAR MOTOR MOUNT

(71) Applicants: Max Chapin, Salem, OR (US); Jordan Chapin, Salem, OR (US); Joshua Chapin, Salem, OR (US)

(72) Inventors: Max Chapin, Salem, OR (US); Jordan Chapin, Salem, OR (US); Joshua Chapin, Salem, OR (US)

( * ) Notice: Subject to any disclaimer, the term of this patent is extended or adjusted under 35 U.S.C. 154(b) by 0 days.

(21) Appl. No.: 18/172,297

(22) Filed: Feb. 21, 2023

(65) Prior Publication Data
US 2023/0191888 A1     Jun. 22, 2023

Related U.S. Application Data

(63) Continuation of application No. 17/142,973, filed on Jan. 6, 2021, now Pat. No. 11,654,765.

(51) Int. Cl.
*B60K 5/12*     (2006.01)

(52) U.S. Cl.
CPC ................................. *B60K 5/1225* (2013.01)

(58) Field of Classification Search
CPC .. B60K 5/1208; B60K 5/1225; B60K 5/1266; B60K 5/1275
See application file for complete search history.

(56) References Cited

U.S. PATENT DOCUMENTS

| | | | | |
|---|---|---|---|---|
| 2013/0269651 A1* | 10/2013 | Higashi | ................... | F16F 15/08 123/198 R |
| 2016/0003322 A1* | 1/2016 | Bradshaw | ............ | B60K 5/1208 267/140.13 |
| 2018/0073674 A1* | 3/2018 | Kim | ....................... | F16F 1/3849 |
| 2018/0148104 A1* | 5/2018 | Baluch | ............... | B62D 33/0608 |
| 2020/0271182 A1* | 8/2020 | Hugenschmidt | .......... | F16F 7/09 |
| 2020/0325957 A1* | 10/2020 | Werner | ............... | F16F 13/1481 |
| 2022/0212532 A1* | 7/2022 | Gutierrez | .............. | F16F 1/3732 |
| 2022/0339999 A1* | 10/2022 | Chapin | ................ | B60K 5/1225 |
| 2023/0184307 A1* | 6/2023 | Chen | ..................... | F16F 1/3835 267/292 |

* cited by examiner

*Primary Examiner* — Jeffrey J Restifo
(74) *Attorney, Agent, or Firm* — Mark S Hubert

(57) ABSTRACT

A vehicular motor mount made of a motor mount assembly and a frame mount assembly made of four components: a base plate, a capture ring, a post and a bushing. The post mechanically connects directly to the engine mount bracket and the base plate directly connects to the subframe of the vehicle. The polymer bushing is bonded directly to the post. The concave capture ring is directly connected to the base plate forming a capture housing with a cavity wherein the post and bushing of the motor mount assembly are constrained but not directly connected to the base plate or capture ring of the frame mount assembly. With no direct connection between the two assemblies, the engine is not directly connected to the subframe. This improves vehicle's ride. The bushing and the capture ring are common to all vehicular motor mounts. The motor mount may be replaced in pieces rather than in its entirety.

6 Claims, 14 Drawing Sheets

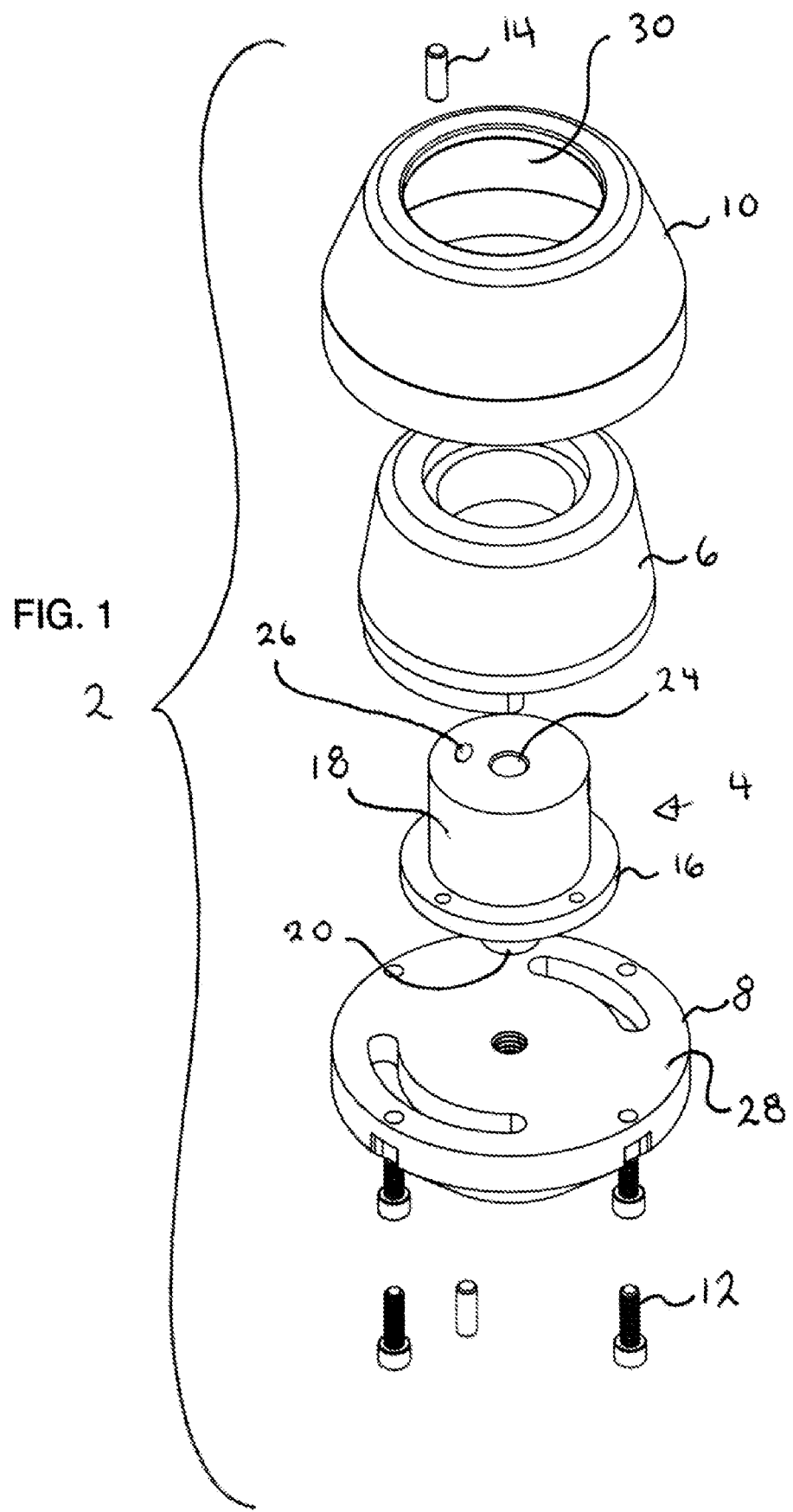

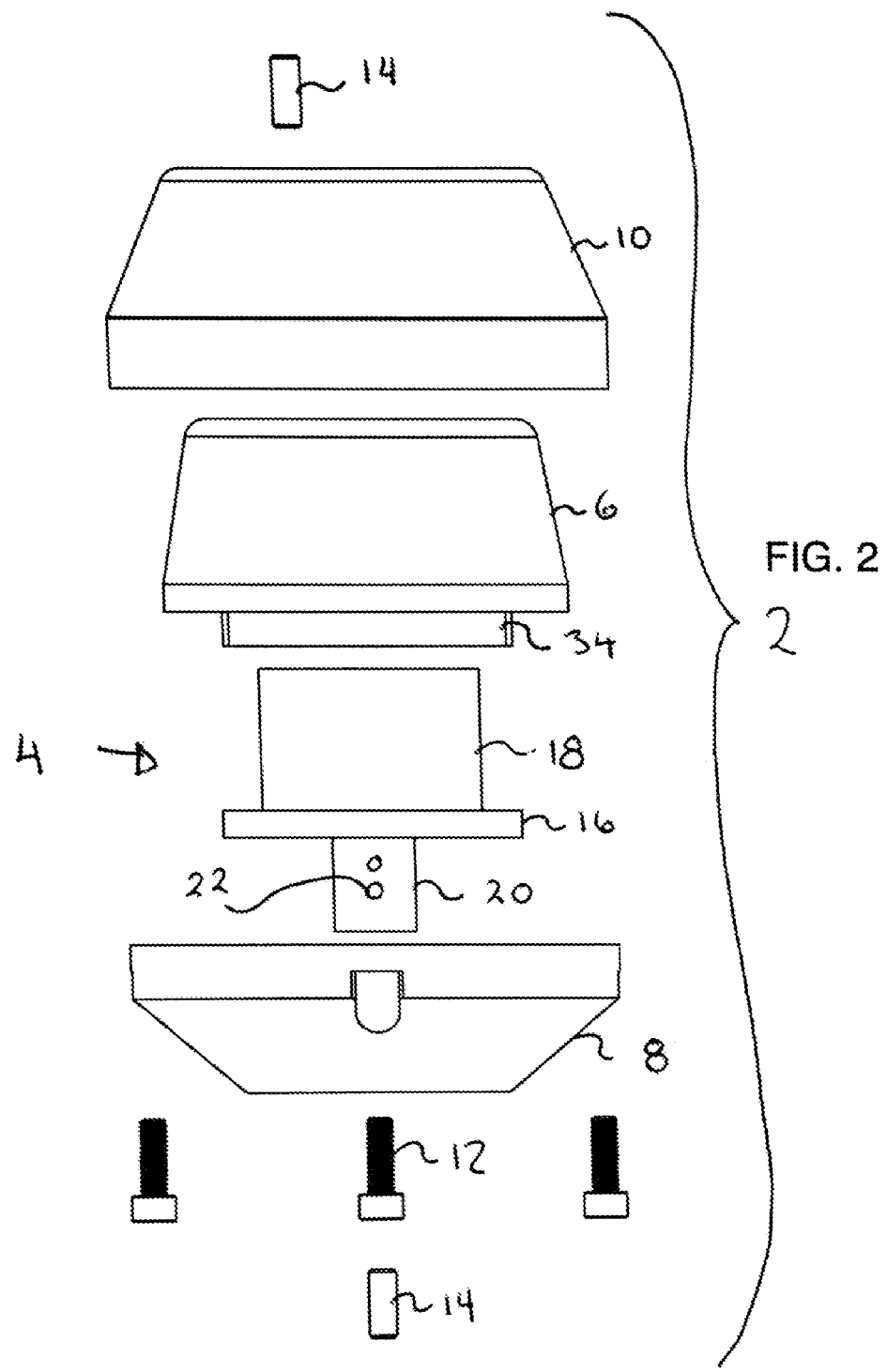

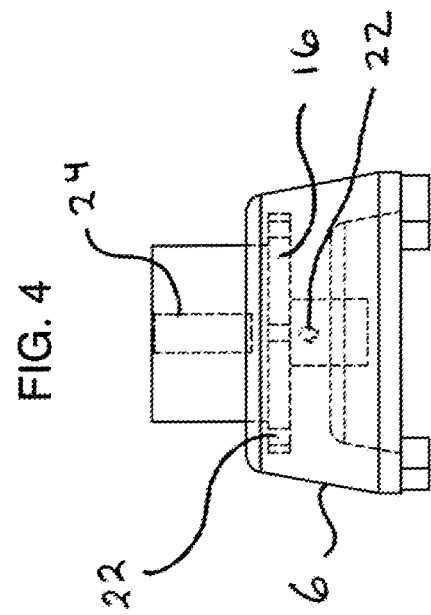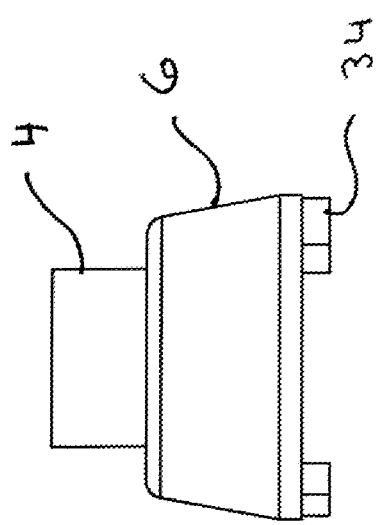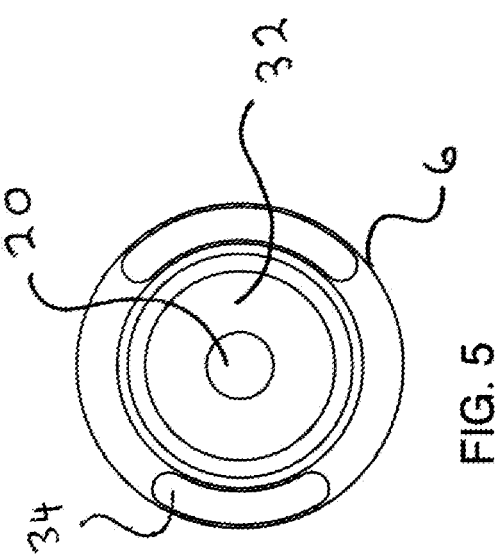

SECTION A-A

SECTION A-A

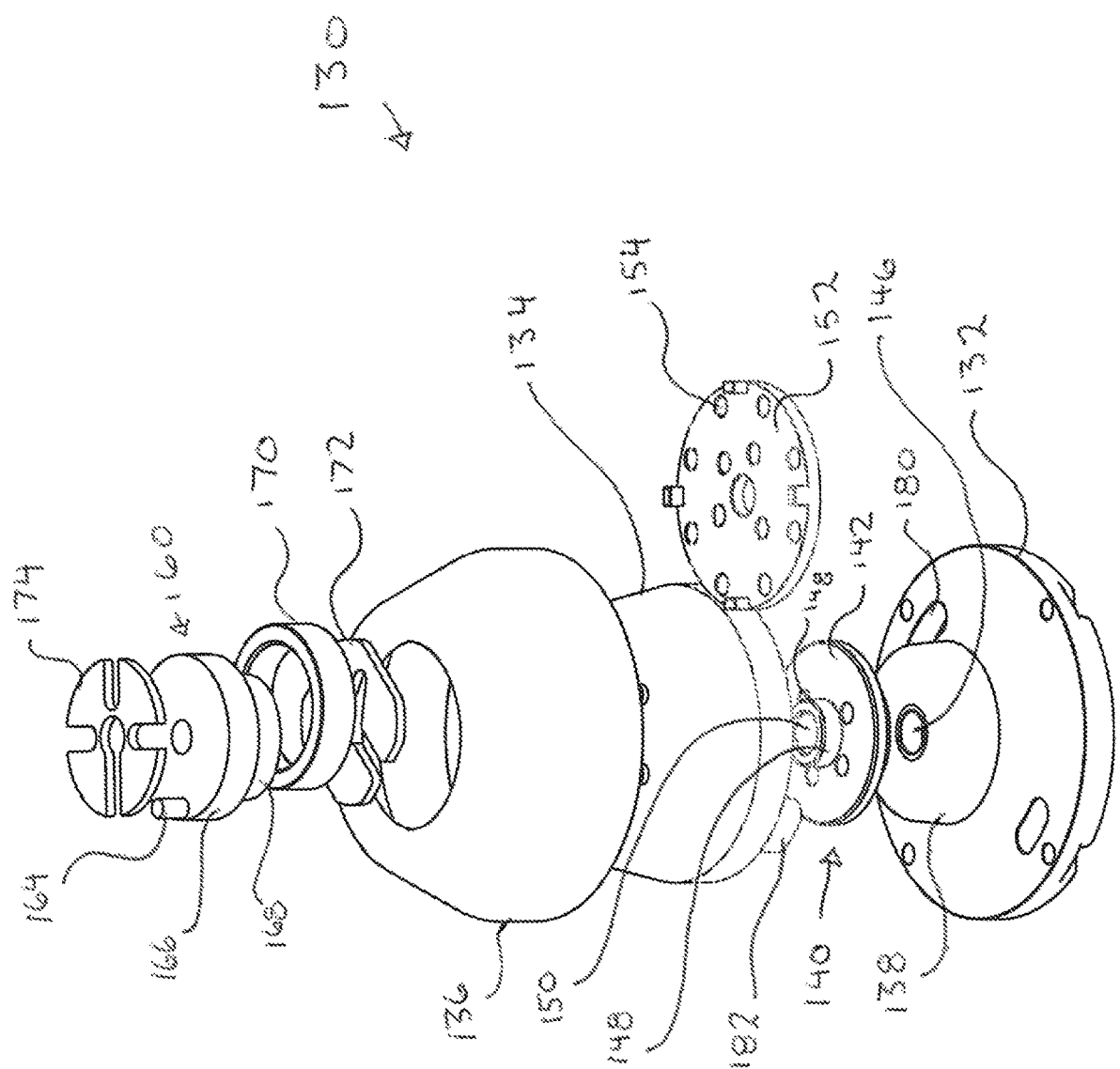

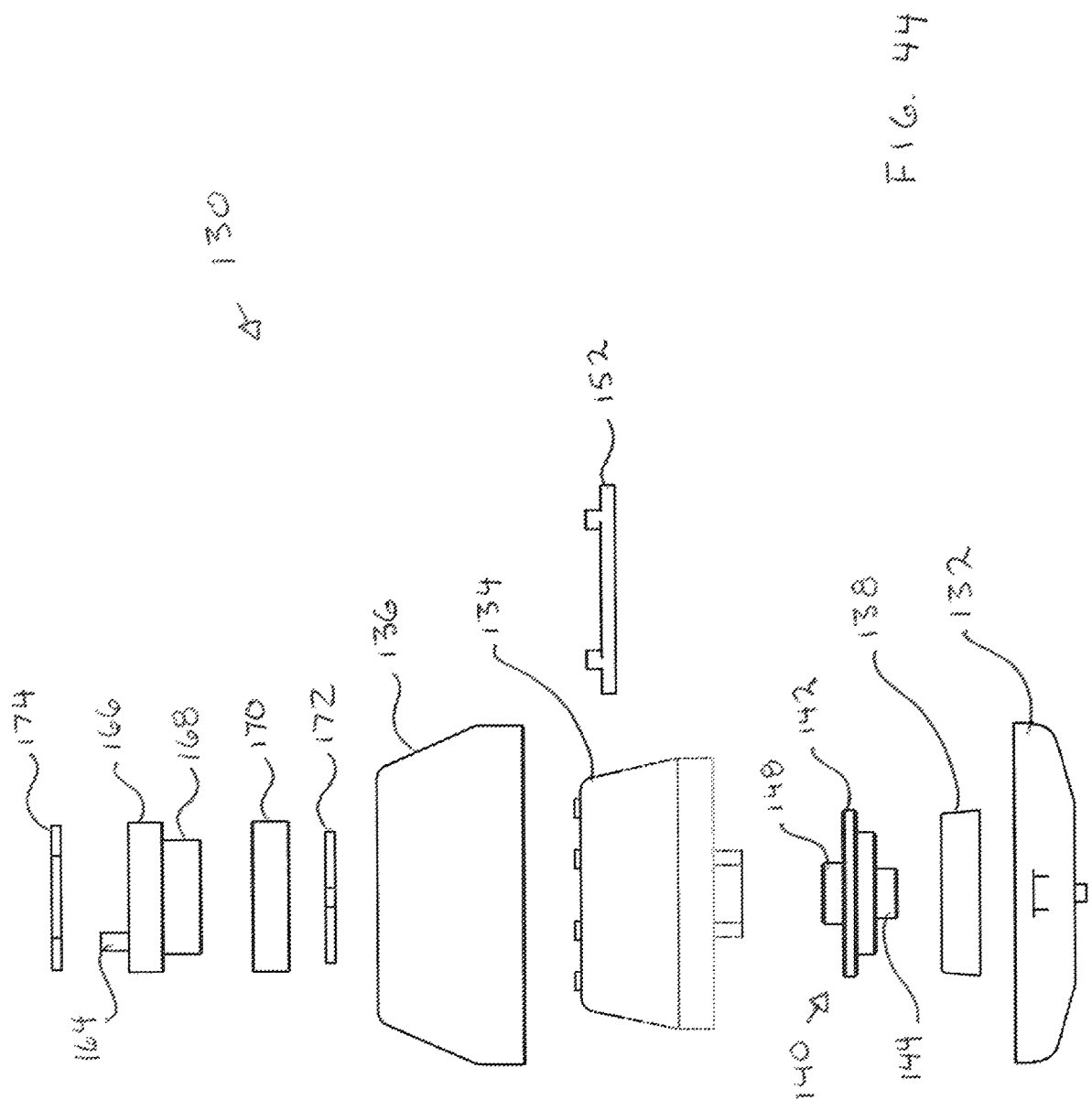

VEHICULAR MOTOR MOUNT

CROSS-REFERENCE TO RELATED APPLICATIONS

This application is a continuation of U.S. patent application Ser. No. 17/142,973, filed Jan. 6, 2021, which is incorporated by reference herein in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to vehicular motor mounts, and more particularly to improved vibration isolation and anti-torque movement technology.

BACKGROUND

The vehicles of today have changed dramatically from those of a decade ago, especially in the performance and luxury sections of this industry. While smoothness and quietness of ride were the most sought after features in luxury cars, these now have been replaced with throaty exhaust notes, and performance times. As an exemplary, a Cadillac® sedan of 2000 had 302 HP whereas a 2020 Cadillac CT5-V has 360 HP. Twin turbocharges seem to be the norm on V6 motors. Similarly, a stock 2010 Chevrolet Corvette® had 345 HP, whereas today it has 490 HP. This represents a 42% increase in power.

These huge leaps in power, however, created other problems. Commensurate with a rise HP, is a rise in torque. As an engine starts there is a momentary unbalanced force that causes the engine to push away from toward the direction of rotation. This requires both stronger couplings between the motor and the vehicle's frame and, also couplings that can repeatedly withstand greater compressive and tensioning loads. At higher power outputs and during acceleration these loads are still present and re magnified. The result, is the transmission of vibration and noise to the vehicle's frame. Not desirable for a luxury or any vehicle.

To better cushion the motor movement from the vehicle, most luxury cars have their engine suspended by a water filled bladder that minimizes vibration between the chassis and motor. While this solves the problem temporarily, with continued vibration and torque, the bladders leak and the cushioning effect is lost. When this occurs the motor's geometry in the car changes slightly and there is more motor rotation and vibration felt inside the vehicle. Additionally, with the motor sitting a little lower, any close tolerances with cables and linkages are reduced, often to the point of contact where they rub and fray to failure on parts of the engine that they continually contact. Thus, these water cushioned motor mounts can almost be seen as a consumable part like filters on the vehicle.

In performance cars, since the engines are larger and the vehicles are smaller, the clearances between the motor and the frame/chassis are reduced such that there is little space for a larger water bag style of motor mount. Commonly, in performance cars their motor mounts are dangerously close to the exhaust manifold such that after numerous heat cycles these bags leak. This wear of their motor mounts may result in the motor colliding with other components in the engine bay when starting or under hard acceleration.

Henceforth, an improved vehicular motor mount that is inexpensive, does not wear out, has a smaller physical profile, can easily have its cushioning members replaced and has a simple design that is easily adapted to a plethora of different vehicles would fulfill a long felt need in the automotive industry. This new invention utilizes and combines known and new technologies in a unique and novel configuration to overcome the aforementioned problems and accomplish this.

BRIEF SUMMARY

In accordance with various embodiments, a universally designed motor mount is provided.

In one aspect, a vehicular motor mount with a motor attachment assembly and a frame attachment assembly coupled together but not directly connected.

In another aspect, a vehicular motor mount having a replaceable polyurethane conical bushing with a hollowed out lower region is provided.

In another aspect, a rebuildable motor mount designed to minimize the harshness of the ride in both low frequency/high amplitude and high frequency/low amplitude vibration conditions.

In yet another aspect, a motor mount having a post and integrated polymer bushing that is directly coupled to the engine mounting bracket, a base plate directly coupled to the vehicle's subframe, and a concave capture housing that is directly connected to the base plate that loosely constrains the polymer bushing and the proximal end of the post therein.

In yet another aspect, a two assembly motor mount system for a plethora of vehicles that that utilizes a universal polymer bushing and universal concave capture housing, wherein there is no direct connection between the member that attaches to the engine mount bracket and the member that connects to the vehicle's subframe.

In a final aspect, a motor mount device that has an upper and lower bump stop that functions in the event of a bushing failure.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 1 is a perspective exploded view of the first embodiment vehicular motor mount;

FIG. 2 is a side exploded view of the first embodiment vehicular motor mount;

FIGS. 3-5 are side, side phantom and bottom views of the motor mount assembly;

FIG. 43 is an exploded, perspective view of the third embodiment vehicular motor mount; and FIG. 44 is a side exploded view of the third embodiment vehicular motor mount.

DETAILED DESCRIPTION OF CERTAIN EMBODIMENTS

Figure 8:
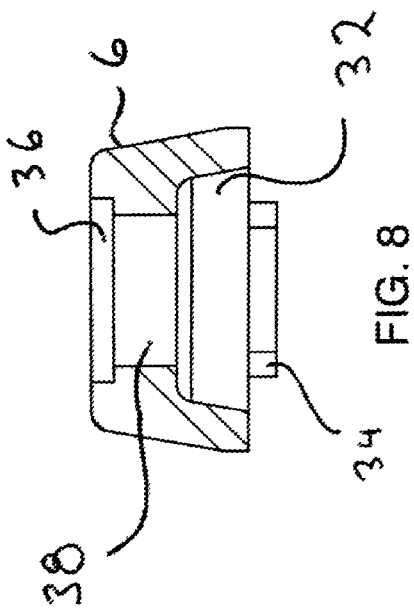
FIGS. 6-9 are perspective, side, side cross-sectional and bottom views of the bushing.
Figure 6:
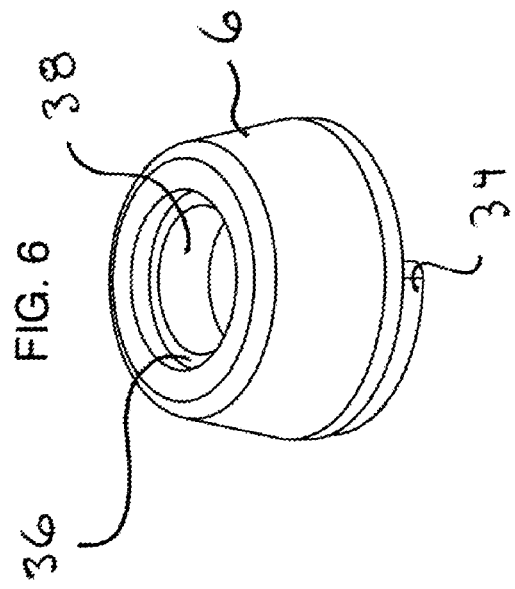
Figure 7:
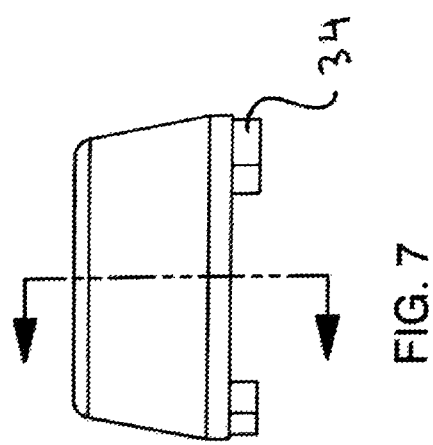
Figure 9:
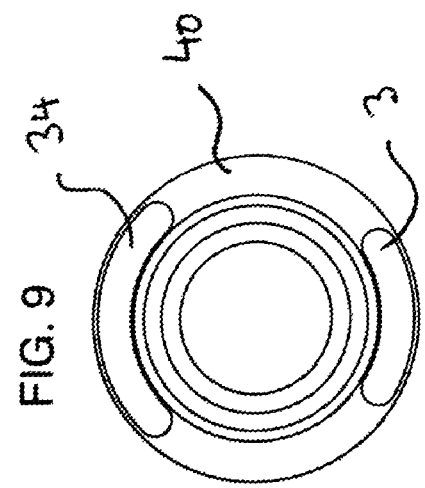
Figure 13:
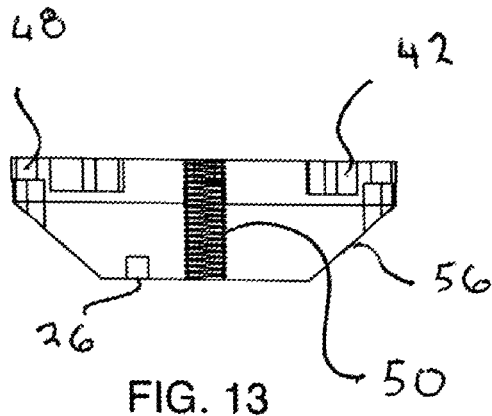
FIGS. 10-14 are bottom perspective, top, bottom, side cross sectional and top perspective phantom views of the base plate.
Figure 14:
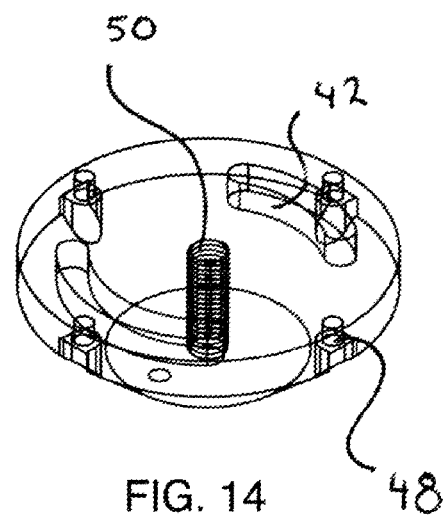
Figure 12:
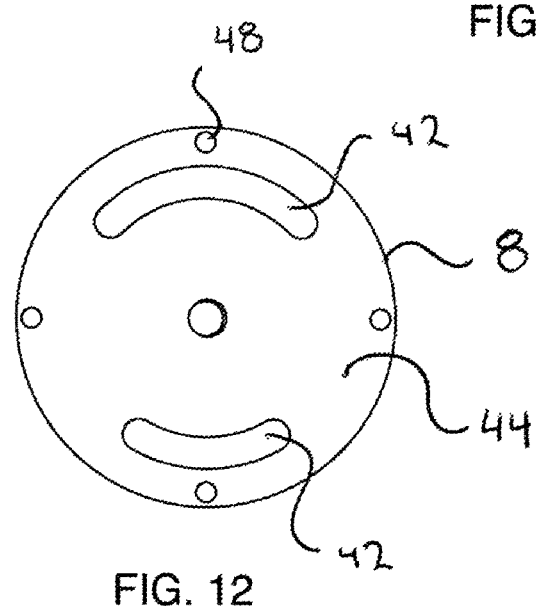
Figure 10:
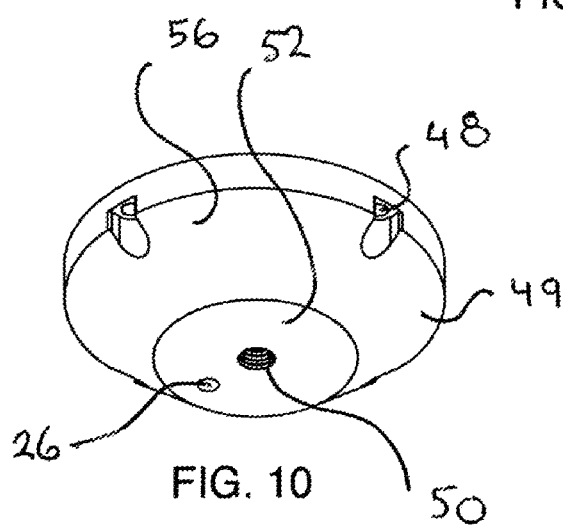
Figure 11:
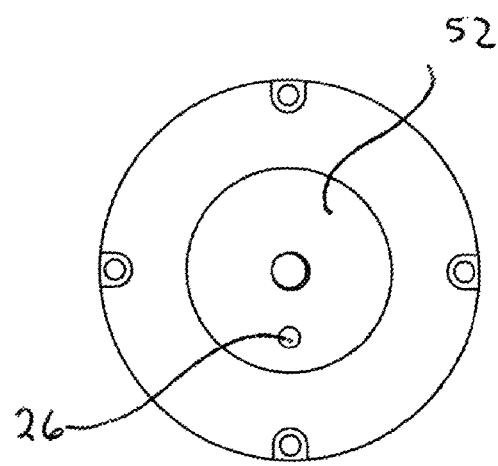

While various aspects and features of certain embodiments have been summarized above, the following detailed description illustrates three exemplary embodiments in further detail to enable one skilled in the art to practice such embodiments. It should be appreciated that certain of the components described with respect to the first embodiment are incorporated in the second and third embodiments as well. Specifically, the capture ring and the bushing. By the same token, however, no single feature or features of any described embodiment should be considered essential to every embodiment of the invention, as other embodiments of the invention may omit such features.

The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when a component is referred to as being "on," "coupled to," or "connected to" another component, it can be directly on, directly coupled to or directly connected to the other component, or intervening components may be present. In contrast, when a component is referred to as being "directly on," "directly coupled to," or "directly connected to" another component, there are no intervening components present, and the components must be in contact at all times without any intervening spacing. Frictional engagement is not a direct connection but rather is an indirect coupling as there is no direct coupling between the parts when the external force of friction is removed. Here, the motor attachment assembly (post/bushing assembly) is coupled to the frame attachment assembly (capture ring/base plate assembly) yet the two components are not directly connected because of the approximately 0.030 to 0.050 inch spacing between the concavity of the capture ring and the top face and the outer side wall of the polymer bushing. Only under sufficient static or dynamic load, (as when the vehicle hits a bump, or when the engine is started) when the bushing undergoes elastic deformation does there become a temporary coupling between the engine mount bracket and the vehicle subframe. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "chassis, frame and subframe" refer to the structural backbone of the vehicle to which the drivetrain and body are attached. The motor is connected to the chassis, frame or subframe through the vehicular motor mount.

A used herein, the term "mechanical fasteners" is used to describe any of one of the mechanical devices used to directly connect components or sub-components and are selected from the set of mechanical fasteners including but not limited to bolts, nuts and bolts, threaded connectors, cross dowels, screws, pins, rivets, washers and anchors.

The present invention relates to a novel design shown in a first, second and third embodiment for a vehicular motor mount. Motor mounts are simple mechanical devices that have two purposes, to connect the motor of the vehicle to the vehicle's frame, and to dampen the vibrations and quiet the noise of the drivetrain that is transmitted to the frame of the vehicle.

The noise and the vibrations combined are known as the harshness, and the frequency of this harshness may or may not be pleasant inside the vehicle. Bouncing has a high amplitude and low frequency, and vibration has a high frequency and a low amplitude. Bouncing arises primarily from driving on uneven surfaces, accelerating and decelerating, and the torque of the engine itself (which causes the engine to twist on its mounts). Vibrations emanate from inside the engine from unbalanced forces, imbalances in the rotating/reciprocating engine parts and the firing pulses in the engine. Accordingly, the motor mount must be able to dampen this harshness to give the engine a greater life (so does not shake itself to death) and the passenger a more comfortable experience. The motor mounts thus have to be stiff to prevent bouncing (low frequencies) but soft to absorb vibrations (high frequencies.) While hydraulic (fluid filled) mounts accomplish this well, they are prone to failure and expensive to replace. The present designs accomplished both of these goals in an economical format but since they are of a polymeric construction with a specific geometry and specific durometer designed for compression and flex, their lifetime is designed for the life of the vehicle, and if not can be replaced cheaply and easily.

The following vehicular engine mounts ("mounts") have two component assemblies, a motor attachment assembly, and a frame attachment assembly that are not directly connected but are coupled by the entrapment of components of the motor attachment assembly within a concave enclosure formed by the components of the frame attachment assembly.

Reference will now be made in detail to three embodiments of the inventive concept, examples of which are illustrated in the accompanying drawings. There are three basic configurations which are functional equivalents, each having a motor mount assembly that has its proximal end captured within a frame mount assembly. The first and second embodiments differ only in that the first embodiment of FIGS. 1 and 2, the post of the motor attachment assembly is made of a single piece of material (preferably billet aluminum) whereas in the second embodiment of FIG. 40, the post is made of several components (an upper peg and a capture flange) that are directly connected together by mechanical fasteners together to form the structurally equivalent post of the first embodiment. The bushing and capture ring of the first and second embodiment motor mounts are universal components that are utilized in all embodiments of vehicular motor mounts. Here though, for illustrative purposes the base plate 8 of the first and second embodiments are also identical.

The first and third embodiments differ in that there is a secondary heat shield added below the post, there is a second urethane bump stop added, there is a wear ring around the new post design and the components embedded in the urethane bushing were separated into an upper and lower part, wherein the lower part is no longer embedded in the bushing but rather abuts it at the bottom.

There is a plethora of different vehicles, all with differing mounting angles from both the subframe and the engine mounting bracket. These may require on site (field) modifications to the post or the base plate such as grinding away of material from the base plate, or these may require specific geometry incorporated into the design of either or both of the base plate and post. As such, there are locating pins 14 utilized in either or both of the motor mount assembly and the frame mount assembly to properly orient the motor mount for proper angular and radial orientation between the motor mount bracket and the vehicle's frame.

Figure 42:
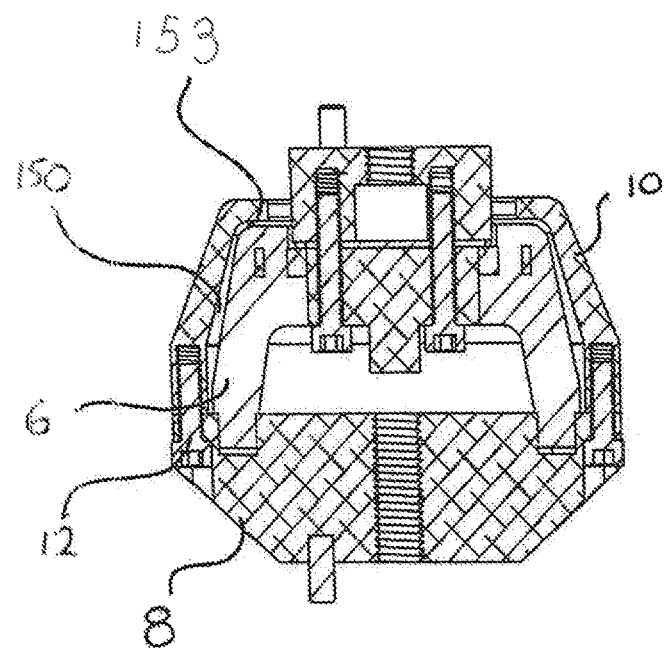
FIG. 42 is a side cross sectional view of the assembled first embodiment motor mount of FIG. 41.

There is a first embodiment mount 2 (FIGS. 1-19, 40, and 41), a second embodiment mount 102 (FIGS. 20-40) and a third embodiment mount (FIGS. 42 and 43). The first and second embodiments differ only in that the second embodiment mount 102, one of the sub-components of the motor attachment assembly (the post) is not formed as a single piece but rather is a sub-assembly made of numerous pieces (a lower peg 104 and upper peg 106) mechanically fastened together to form a sectional post 100, which is the structural equivalent of the post 4 of the first embodiment vehicular motor mount. This is done for fabrication purposes as the upper peg 106 often requires a surface treatment such as anodization or passivation, yet such a surface treatment inhibits the bonding of the polyurethane to the capture flange 116 of the lower peg 104.

Looking at FIGS. 1 and 2, it can be seen that the first embodiment mount 2 has four components: a post 4, a polyurethane bushing 6, a base plate 8 and a concave capture ring 10. For assembly, it utilizes a set of mechanical fasteners 12 (herein bolts sized for threaded engagement into threaded recesses 14 in the bottom face of the capture ring 10.) For proper alignment and orientation to the engine mount bracket and the frame, it uses two locating pins 14 matingly, and frictionally engageable in the post 4 and the base plate 8. The mechanical fasteners 12 join the base plate 8 to the capture ring 6 such that there is an enclosure formed therebetween. These two components, when directly connected, form the frame mount assembly. The enclosure with its cavity formed therein is known as the capture housing and is conformed to the geometrical configuration of the outer face of the bushing but with upper and side clearance spaces or gaps, respectively approximately 0.030 and 0.050 of an inch each plus or minus 0.020 and 0.040 of an inch.

The post 4 is fabricated as a unitary piece with a cylindrical upper section 18 and a cylindrical lower section 20 with a capture flange 16 extending radially therefrom at the interface of the upper and lower sections. Preferably, it is made of a high grade billet aluminum although other materials could be substituted.

Looking at FIGS. 1, 2 and 4 it can best be seen that the top face of the cylindrical upper section 18 has a threaded bore 24 that extends at least partial through the linear axis of the post 4. It also has a locating pin orifice 26 that is sized for frictional engagement with the locating pin 14. When inserted, this locating pin 14 will partially extend from the top face of the post 4 and lock into a matingly engageable orifice in the motor mount bracket (not illustrated) for the proper location and radial orientation of the vehicular motor mount 2. As best seen in FIG. 4, the capture flange 16 and the top part of the lower section 20 are cast into the polyurethane bushing 6. There are flow orifices 22 (FIGS. 1 and 4) formed in the capture flange 16 and optionally into the lower section 20 to allow the polymer material of the bushing 6 to flow into and solidify therein to lock these components together. It is to be noted that the capture flange 16 acts as a top bump stop and will strike the top inner face 30 of the capture ring 10 in the event of a failure of the bushing 6 so as to limit the extent of the increase in distance between the engine and the frame. The cylindrical lower section 20 does not extend to the bottom of the bushing 6 and as such is suspended perpendicularly and at a distance above the planar top face 28 of the base plate 8. In this way, the proximal end of the post 4 acts as a bottom bump stop and will strike the base plate 28 upon failure of the bushing 6 or upon extreme compression of the bushing 4 within the capture ring 10, to limit the reduction of the distance between the engine and the frame. The bushing 6 and post 4 when directly joined together are known as the engine mount assembly. The post 4 is not directly connected to any part of the frame mount assembly. Looking at FIGS. 3 to 5 it can be seen how the bushing 6 is cast around the post 4, flowing into the orifices in the capture flange 16 and the top part of the lower section 20 of the body of the post 4.

FIGS. 6-9 show the polymer bushing 6. Preferably it is made of a polyurethane and has a hardness of 75 on the Durometer Shore A Hardness Scale (plus or minus 20.) It is a tapered circular cylinder with a concave void 32 formed in its bottom end and is matingly geometrically configured to the inside (concave) face of the capture ring 10. Dimensionally, though, the outside diameter of the bushing 6 is smaller than the inside diameter of the capture ring 10 by approximately 0.100 of an inch so as to leave approximately 0.050 of an inch clearance between the capture ring 10 and the bushing 6. Similarly, there is approximately 0.030 clearance gap between the top of the busing and the top inner face of the capture ring 10. Some or all of this clearance will disappear when the load of the engine weight is put onto the post 4 and it moves slightly closer to the base plate 8, compressing the bushing 4 and making it bulge until its side or part of its side, touches the inner side walls of the capture ring 10. It has a central bore 38 therethrough that matches the diameter of the lower section 20 of the post 4 and an inner depressed ring 36 where a portion of the capture flange 16 resides. The remainder of the capture flange 16 is imbedded in the bushing 6 itself as best illustrated in FIG. 4. On the bottom face 40 of the bushing 6 are two different sized, curved location tabs 34 for the proper alignment and radial orientation of the motor mount assembly to the engine mount assembly. These two non-linear alignment tabs 34 fit into mating recesses 42 formed on the top surface 44 of the base plate 8.

The bushing 6 and the capture ring 10 are universal components of an engine mount. That is to say that for different vehicles, the base plate 8 and the distal end of the post 4 may vary geometrically but the configuration of capture ring 10 and the bushing 6 will remain identical.

Looking at FIGS. 10-14 is can be seen that the base plate 8 has a solid body 49 with a planar top face 44 that has a circular series of orifices 48 formed therethrough to accommodate the mechanical fasteners 12 that engage the threaded orifices 46 in the outer periphery of the capture ring 10. There are also recesses 42 that are matingly conformed to allow the insertion of the two alignment tabs 34 of the bushing 6 so as to lock the radial orientation of the bushing 6 (and essentially the motor mount assembly) to the base plate 8 (and essentially the frame mount assembly.) Through the center of the base plate 8 is a threaded bore 50 that allows a bolted connection between the base plate 8 and the frame (not illustrated). The bottom face 52 of the base plate 8 has a locating pin orifice 26 formed therein, substantially similar to the locating pin orifice 26 formed in the top face of the post 4. Here a locating pin 14 is inserted into the locating pin orifice and extends beyond the bottom face 52 such that it can be inserted into a recess in the frame (not illustrated) so as to align and radial orient the mount 2 to the frame.

The solid body of the base plate 8 is generally thick enough to allow the removal of material across it thickness to alter the angle that the base plate 8 (and overall mount) will have from the frame. Depending on where the frame mount assembly attaches to the frame in relation to where the engine mount assembly attaches to the engine mount bracket, the entire mount 2 may be angled and may require specific radial orientation for the insertion of the locating pins 14 on either end of the mount 2. Although shown having a tapered side 56, this is only for a specific embodiment and not common to all base plates. Since the design of the base plate will vary for different vehicles, there will be at least one threaded bore 50 in each base plate 8 for frame connection, however, each base plate 8 will have a planar top face 44 for the capture ring 10 and the bushing 6 to rest on, and a circular series of orifices 48 to allowed the bolted connection to the capture ring 10.

Figure 16:
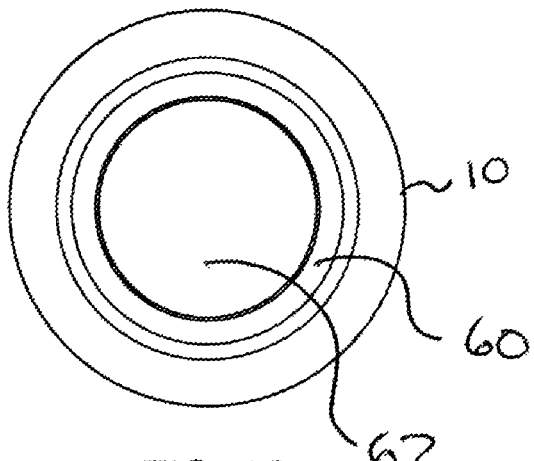
FIGS. 15-19 are perspective, top, side, side cross-sectional and bottom views of the capture ring.
Figure 15:
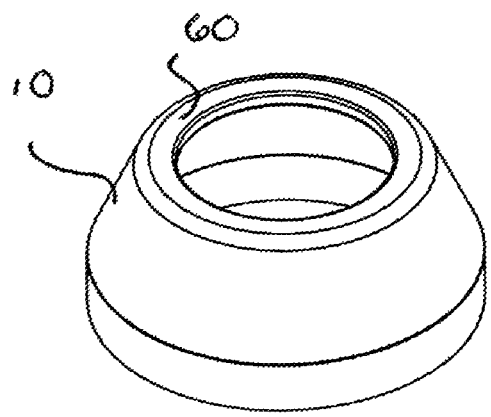
Figure 19:
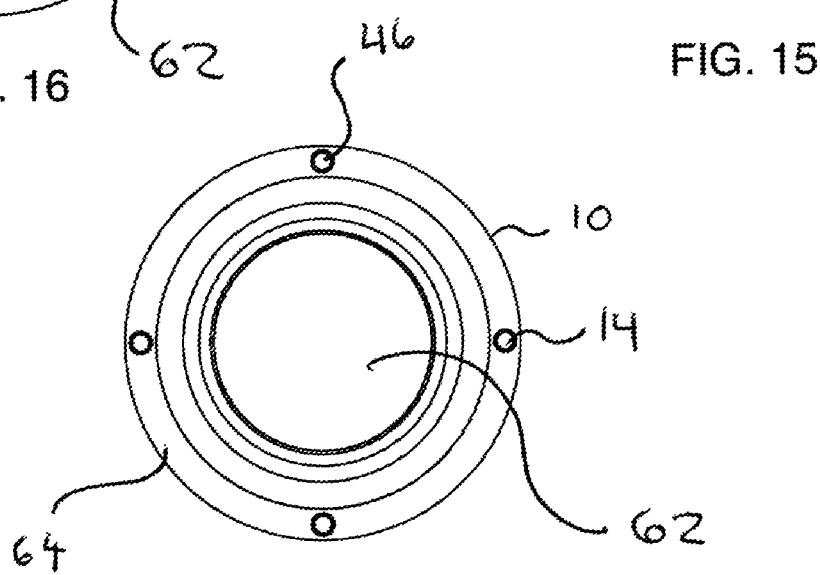
Figure 17:
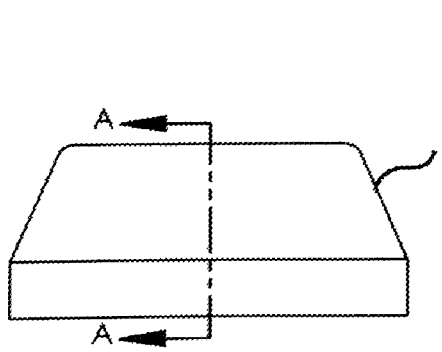
Figure 18:
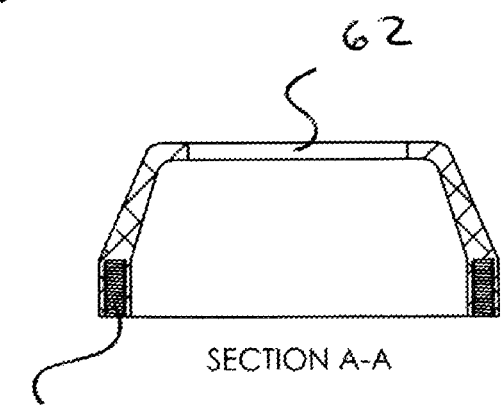
Figure 21:
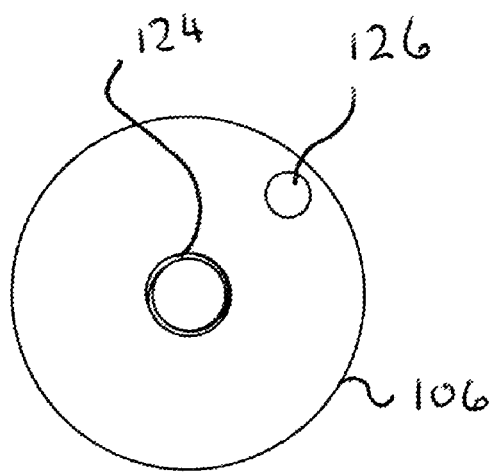
FIGS. 20-25 are top perspective, top, bottom, bottom perspective, side and side cross-sectional views of the upper peg of the second embodiment vehicular motor mount.
Figure 20:
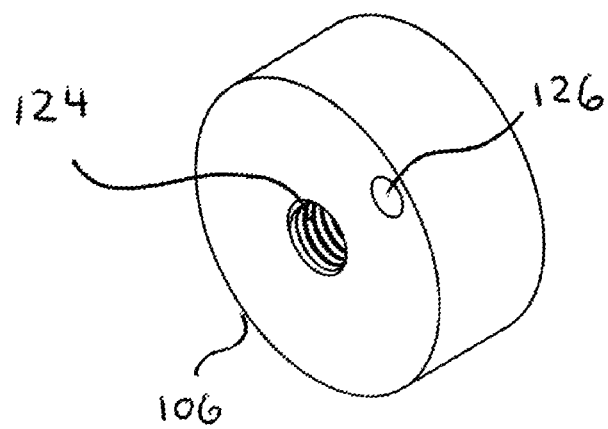
Figure 22:
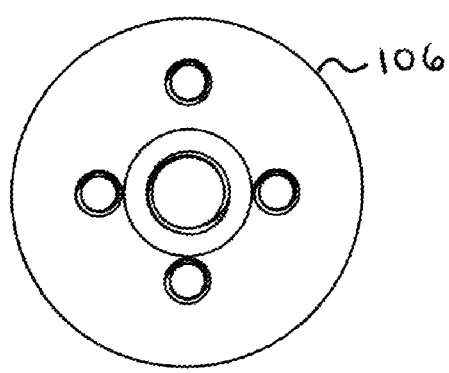
Figure 23:
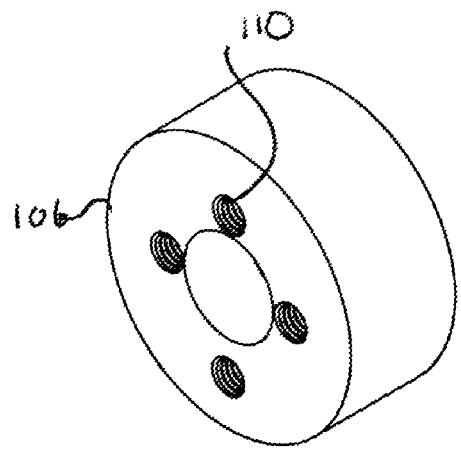
Figure 24:
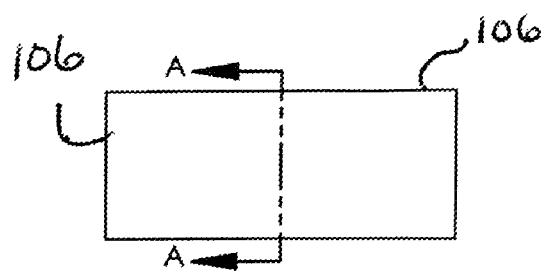
Figure 25:
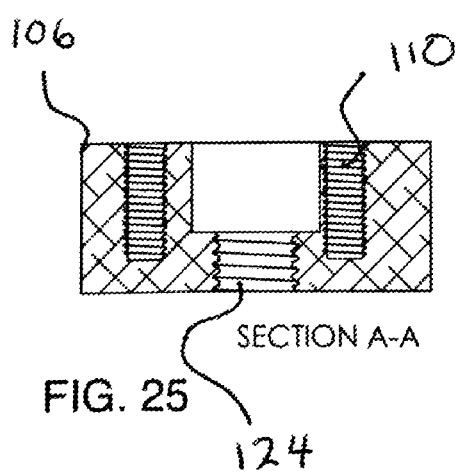
Figure 26:
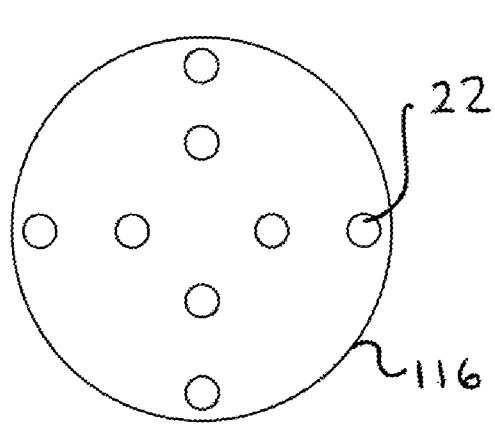
FIGS. 26-30 are top, top perspective, bottom perspective side and side cross-sectional views of the capture flange of the second embodiment vehicular motor mount.
Figure 27:
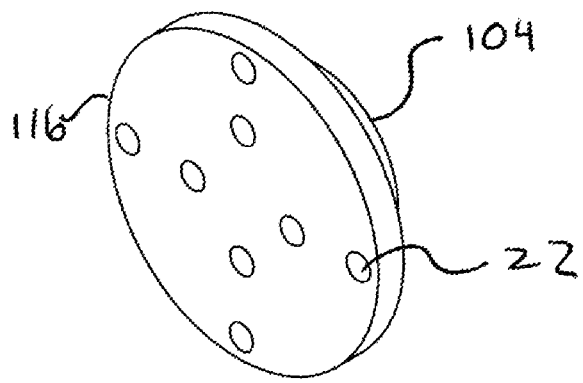
Figure 28:
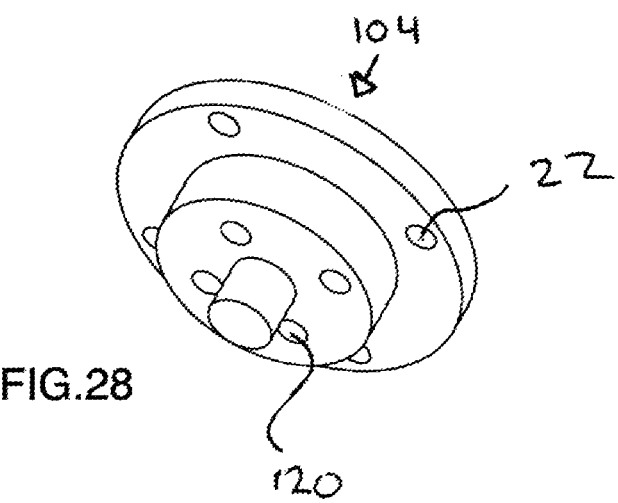
Figure 29:
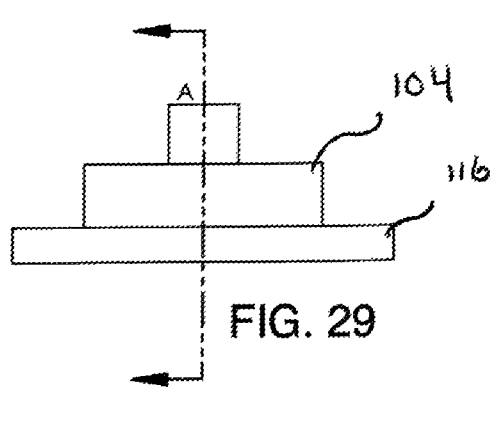
Figure 30:
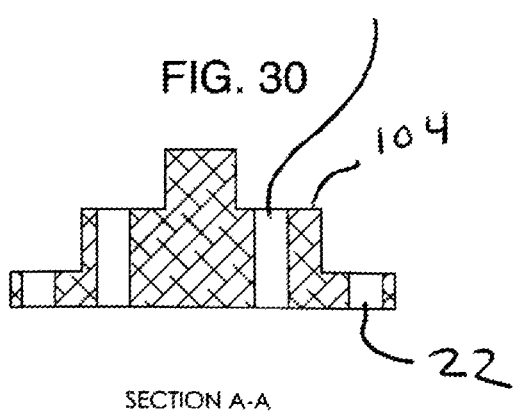
Figure 36:
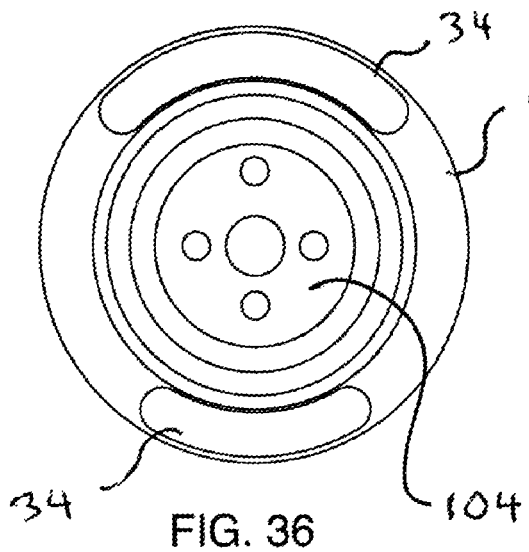
FIGS. 35-36 are a perspective view and top view of the bushing with the imbedded capture flange.
Figure 35:
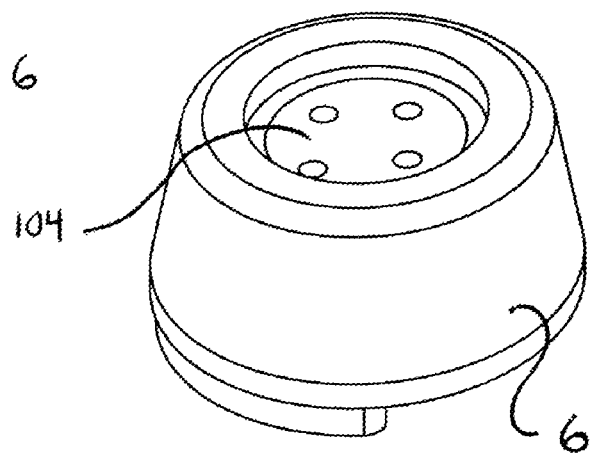
Figure 31:
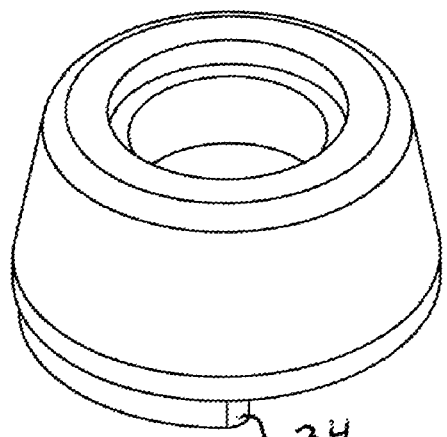
FIG. 31 is a side perspective of the bushing.
Figure 32:
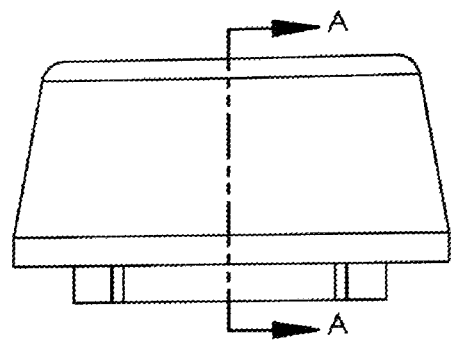
FIG. 32 is a side view of the bushing with the imbedded capture plate.
Figure 33:
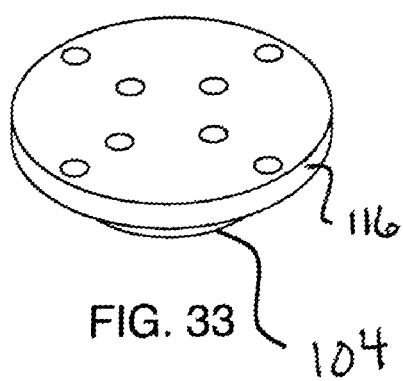
FIG. 33 is a top perspective view of the capture flange.
Figure 34:
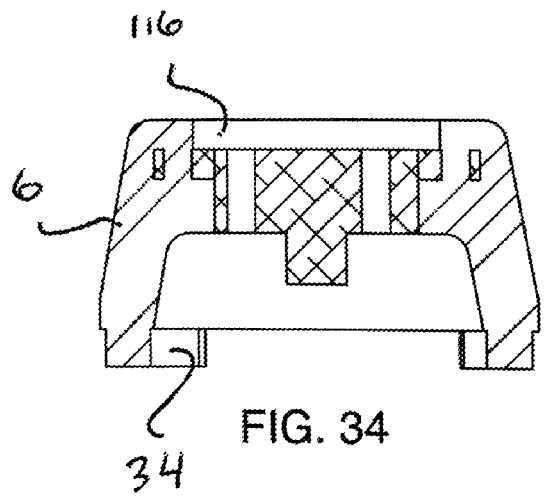
FIG. 34 is a cross sectional view of the side view of the bushing with the imbedded capture flange.

The capture ring 10 is illustrated in its entirety in FIGS. 15 to 17. Therein it can be seen that the capture ring 10 is a hollow, frusotconical ring with an internal flange 60 extending from its upper peripheral edge along its frustum toward its axial centerline. It has a central circular orifice 62 formed through its internal flange 60 that is dimensionally larger than the diameter of the upper section 18 of the post 4 yet smaller than the diameter of the bushing 6. It has a series of threaded bores 46 formed in its bottom face 64 to accommodate mechanical fasteners 12 passing through the base plate 8 as discussed herein.

When the mount 2 is assembled, the cylindrical lower section 20 and capture flange 16 of the post 4, and bushing 6 (the motor mount assembly) are loosely coupled but constrained in the capture housing. There is no direct connection or coupling between the post 4 and the base plate 8. The post 4 connects (is bolted) to the engine mount bracket and the base plate 8 connects (is bolted) to the frame, but the two are not directly connected, rather the bushing 6 cast about or around the proximal end of the post 8 is captured/constrained in the concavity of the capture housing that is connected to (bolted) to the base plate 8. The mount 2 must be "clocked" to the proper rotation for alignment with that vehicle's engine mount bracket.

Figure 41:
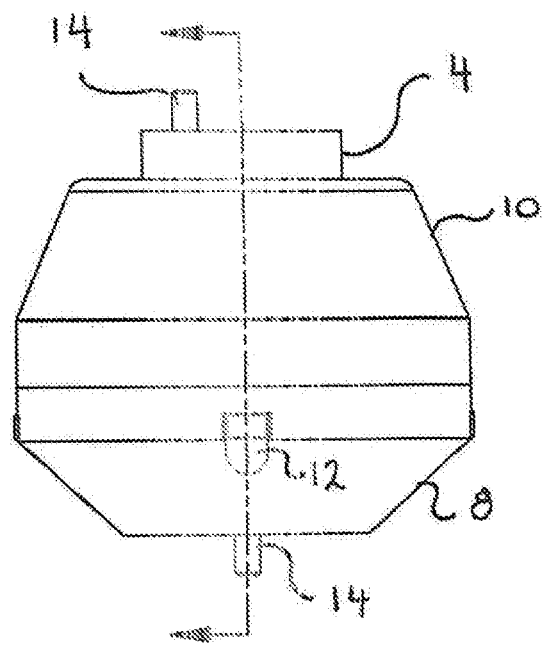
FIG. 41 is a side view of an assembled first embodiment motor mount.

Looking at FIGS. 41 and 42 the motor mount assembly and the frame mount assembly in an assembled state can best be seen. Here, it can be seen that within the cavity created in the capture housing (formed by the capture ring 10 directly connected by bolts 12 to the base plate 8), the bushing 6 and lower section of the post 20 are physically constrained or captured so that the motor mount assembly is not directly connected to the frame mount assembly and has limited movement therein for the absorption of noise and vibration. There is a side gap 150 between the bushing 6 and the inner concave wall of the capture ring, and there is a top gap 153 between the capture flange 16 of the capture ring 10 and the top face of the bushing 6. The proximal end of the post is approximately ⅜ of an inch above the planar top face 28 of the base plate 8, and the bottom end of the bushing rests on the top face of the base plate 8.

With this design, the post 4 is free rotate and tilt slightly within respect to the its linear axis as well as translate up and down within the capture ring 6 as torque, vibrational and bouncing forces are experienced in the engine or frame. In these gyrations the bushing 6 experiences different amounts of compressional forces and it elastically deforms under this load because of its internal concave void 32 and tapered body to absorb these forces and isolate them from the driver. The amount of tilt the post 4 can accommodate is limited by the difference between the inner diameter of the top bore 62 of the capture ring 10 and the outer diameter of the post 4. The amount of translational movement the post can accommodate is limited to the distance between the proximal end of the post 4 and the top face of the base plate 8 and the space between the compressed bushing 6 under load and the inner top of the capture ring 10.

The post and bushing assembly (the motor bracket mount assembly) float in the concavity created between the capture ring 10 and the base plate 8. There is no direct connection or direct coupling between the post 4 and the base plate 8. The post 4 connects (is bolted) to the engine mount bracket and the base plate 8 connects (is bolted) to the frame but the two are not directly connected, rather the bushing 6 cast about or around the proximal end of the post 4 is captured/constrained in the concavity of the capture ring 10 that is connected to (bolted) to the base plate 8.

Figure 40:
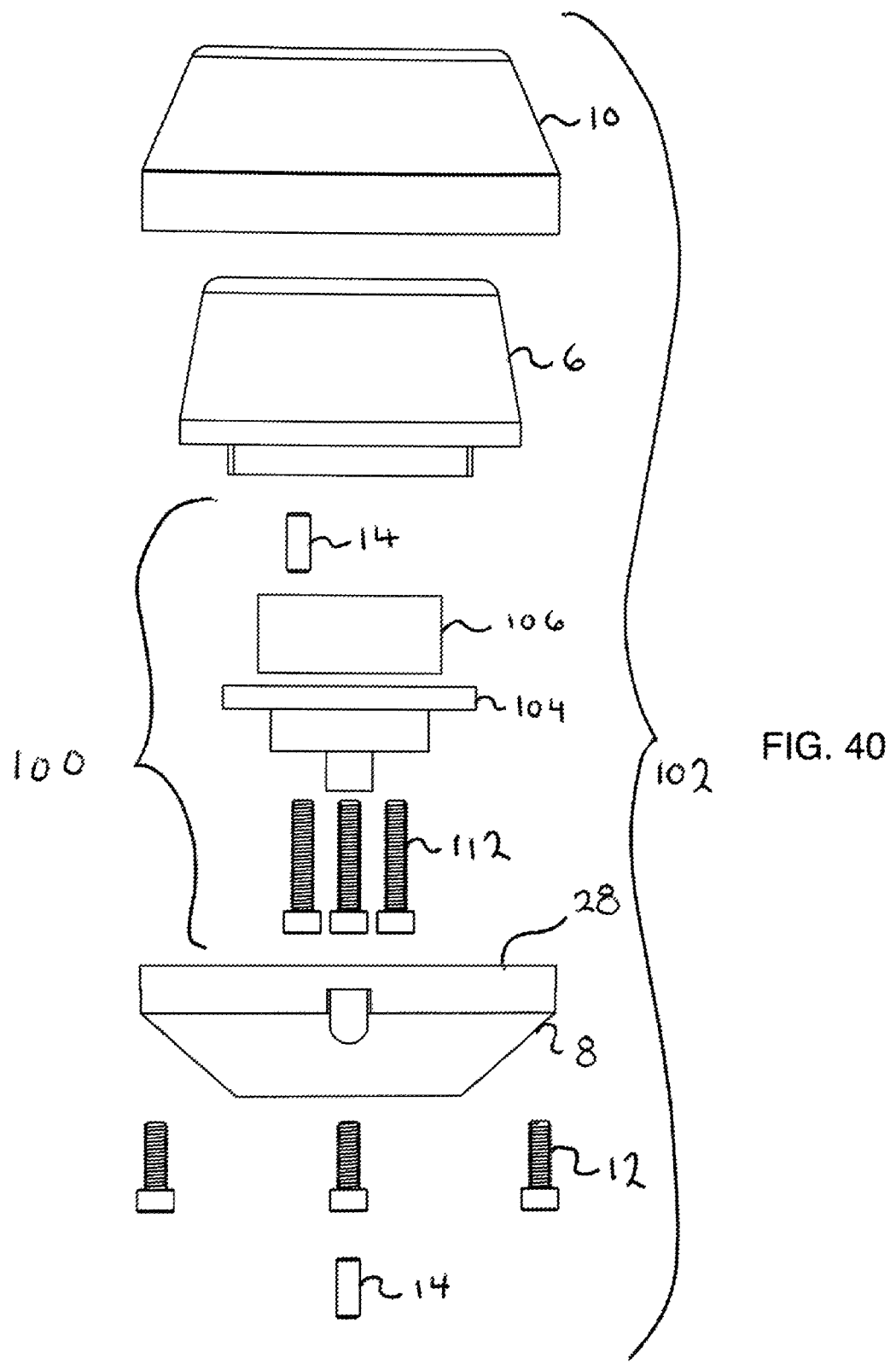
FIG. 40 is a side exploded view of the second embodiment vehicular motor mount.

Looking at the second embodiment mount 102 of FIG. 40 it can be seen that the capture ring 10, and truncated conical polyurethane bushing 6 are shared with those of the first and third embodiments. Here, although the same base plate 8 is also used, this for simplicity of explanation, as the base plate 8 may have of any of a host of different designs to accommodate connection of the mount to the frame of a specific vehicle. The post 4 of the first embodiment mount 2 is replaced with a sectional post 100 that is made of a lower peg 104 and upper peg 106 that have been connected together with second mechanical fasteners 112.

It can be seen in FIGS. 21-25 that the cylindrical upper section 18 of the post 4 of the first embodiment mount 2 is the structural equivalent of the upper peg 106 of the sectional post 100 if the second embodiment mount 102, and the capture flange 16 and lower section 20 of the first embodiment mount 2 are the structural equivalents of the lower peg 104 with its capture flange 116 of the second embodiment mount 102.

The upper peg 106, identical to the top face of the cylindrical upper section 18, has a threaded bore 124 that extends at least partial through the linear axis of the sectional post post 100. It also has a locating pin orifice 126 that is sized for frictional engagement with the locating pin 14 that will partially extend from the top face of the sectional post 100 and lock into a matingly engageable orifice in the motor mount bracket (not illustrated) for the proper location and radial orientation of the second embodiment vehicular motor mount 102. The upper peg 106 also has a series of threaded orifices 110 formed partially therethrough to accommodate second mechanical fasteners 112 that pass through orifices 120 formed through the lower peg 104 and serve to connect these components to form the sectional post 100.

As best seen in FIGS. 26-30 the lower peg 104 is a cylindrical peg with a second capture flange 116 extending from its top end. It is this entire lower peg 104 that has the bushing 6 cast onto it. There are flow orifices 22 formed in the second capture flange 116 to allow the polymer material of the bushing 6 to flow into and solidify therein to lock these components together. It is to be noted that the second capture flange 116 also acts as a top bump stop and will strike the top inner face 30 of the capture ring 10 in the event of a failure of the bushing 6 so as to limit the extent of the increase in distance between the engine and the frame. The lower peg 104 does not extend to the bottom of the bushing 6 and as such is suspended perpendicularly and at a distance above the planar top face 28 of the base plate 8.

FIGS. 31-36 illustrate the lower peg 104 of the sectional post 100 bonded to the bushing 6. Similar to the first embodiment motor mount 2, the second embodiment motor mount must be properly oriented and angled between the motor mount bracket and the frame. This is accomplished by the two non-linear alignment tabs 34 fit into mating recesses 42 formed on the top surface 44 of the base plate 8, as well as the locating pins 14 extending from the locating pin orifices 26 in the base plate 8 and the sectional post 100.

Figure 38:
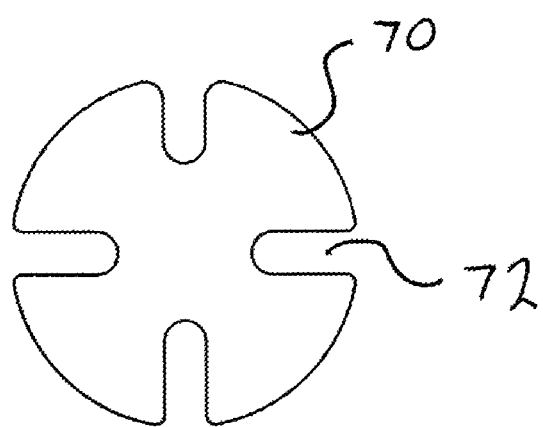
FIGS. 37-39 are perspective, top and side views of the optional heat shield.
Figure 37:
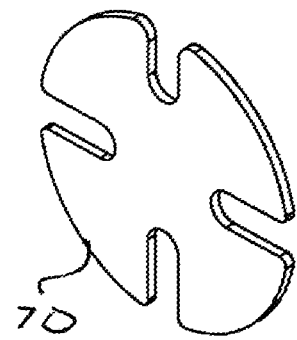
Figure 39:

In certain situations, the top of the mount 2 may be situated in very close proximity to exhaust manifolds or header tubes extending from the vehicle's motor. Here, the high temperatures emanating from them, in conjunction with the air flow patterns under the hood may radiate heat or force hot air down onto the bushing 6. To alleviate this problem, an optional heat shield 70 as seen in FIGS. 37-39 may be placed into the sectional post 100 between the lower peg 104 and the upper peg 106 to protect the bushing 6. The heat shield 70 is a planar, circular disk made of a high temperature insulating polymer or ceramic coated metal and has slots 72 to accommodate the second mechanical fasteners 112 connecting the components of the sectional post 100.

Looking at FIGS. 43 and 44 it can be seen that the third embodiment motor mount 130 has a base plate 132 that uses mechanical fasteners (not illustrated in this bolts) 12 to join the base plate 132 to the capture ring 136 such that there is an enclosure formed therebetween. These two components, when directly connected, form the frame mount assembly. The enclosure with its cavity formed therein is known as the capture housing and is conformed to the geometrical configuration of the outer face of the bushing 134 but with upper and side clearance spaces or gaps, respectively approximately 0.030 and 0.050 of an inch each plus or minus 0.020 and 0.040 of an inch. In this capture housing there is also a polyurethane lower bump stop 138 that resides below the capture flange 142 of the lower post 140 and held centered in place by the lower cylindrical section 144 that frictionally engages its central orifice 146.

The base plate 132 has a pair of arced location slots 180 for the proper alignment of the motor mount assembly through arced location tabs 182 extending from the bottom face of the bushing 134. There is also a circular series of orifices that allow the mechanical fasteners to connect the base plate 132 to the capture ring 136 as discussed above. In the center of the base plate is a threaded bore to allow the frame mount to be connected.

In this third embodiment, the post is made into two pieces, a lower post 140 and an upper post 160. The lower post 140 resides in the capture housing between the lower bump stop 138 on the base plate 132 and the tapered cylindrical bushing 134. It has a lower cylindrical section 144 and an upper cylindrical section 148 separated by the capture flange 142. There is a threaded central bore 150 formed therethrough the post 140. Here though, different from the first two embodiments, the post 140 is not embedded (cast) into the bushing 134. Rather, there is a circular support disk 152 embedded into the bushing 134. This support disk 152 has through orifices adjacent its perimeter edge that allows the polyurethane during the cast process to flow into them so as to lock the support disk 152. It also has inner threaded orifices 154 that allow the passage of mechanical fasteners 12 (not illustrated in FIGS. 43 and 44) that extend from the lower post 140 through the bushing 134 and its embedded support disk 152 and into the threaded recesses in the bottom of the top post 160. This support disk 152 prevents the premature failure of the bushing 140 due to the bushing's expansion radially outward under load.

The top post 160 is a stepped cylinder with the lower portion 168 having a smaller diameter that the top portion 166. The top post 160 has a central orifice 162 formed therethrough, a cylindrical pin 164 extending normally therefrom its top face and a series of thread bores on the bottom face of its lower portion 168. Around the lower portion 168 is a wear ring 170 to absorb side thrust loads, preferably made of a high durometer polymer.

The top post 160 when bolted to the lower post 140 pre-compresses the bushing 134 and centers it in the capture ring 136. Above the top post 160 and between the top post 160 and the bushing 134 there are primary heat shields 174 and secondary heat shields 172.

The top post 160 with its wear ring, the bushing 134 with its embedded support disk 152, and the lower post 140 when bolted together form the engine mount assembly. The engine mount is bolted through the aligned central orifices of the components in the engine mount assembly. The two heat shields 172 and 174 prevent radiant heat from the engine and its exhaust form damaging the polymer components of the motor mount 130. The pin 164 extending from the top post 160 is used to locate and properly position the motor mount 130 with respect to the engine mounts and the frame mounts.

This third embodiment motor mount 130 functions identically to that of the first and second embodiment motor mounts in that when the mount 130 is assembled, the motor mount assembly is loosely coupled but constrained in the capture housing so there is no direct connection or coupling between the lower post 140 and the base plate 132. The post assembly 140 and 160 connects (is bolted) to the engine mount bracket and the base plate 132 connects (is bolted) to the frame, but the two are not directly connected, rather the bushing 134 is captured/constrained in the concavity of the capture housing that is connected to (bolted) to the base plate 132. The mount 302 must be "clocked" to the proper rotation for alignment with that vehicle's engine mount bracket.

The bump stop functions the same way except in the third embodiment there is an additional polymer member to prevent the harsh metal on metal contact when the bottom bump stop is utilized.

While increasing the ability of a motor mount to dampen and remove the harshness of a ride, the present invention provides a mount system for all vehicles made of two assemblies assembled from four components, two of which (the capture ring and bushing) are universal and replaceable. Thus, this motor mount can be rebuilt in the case of failure or extreme wear.

While certain features and aspects have been described with respect to exemplary embodiments, one skilled in the art will recognize that numerous modifications are possible. Moreover, while the procedures of the methods and processes for building, assembling and using the devices described herein are described in a particular order for ease of description, unless the context dictates otherwise, various procedures may be reordered, added, and/or omitted in accordance with various embodiments. The various components and/or features described herein with respect to a particular embodiment can be substituted, added, and/or subtracted from among other described embodiments, unless the context dictates otherwise. Consequently, although two exemplary embodiments are described above, it will be appreciated that the invention is intended to cover all modifications and equivalents within the scope of the following claims.

Having thus described the invention, what is claimed as new and desired to be secured by Letters Patent is as follows:

1. A vehicular motor mount connected between a vehicle's motor mount bracket and a vehicle's frame, comprising:
   a motor attachment assembly having a distal end and a proximal end, said distal end directly connectable to said vehicle's motor mount bracket; and
   a frame attachment assembly defining a cavity therein and directly connectable to said vehicle's frame;
   wherein said proximal end of said motor attachment assembly is moveably captured within said cavity in said frame attachment assembly without any direct connection there between and with a side space and a top space existing between said motor attachment assembly and said frame attachment assembly within said cavity; and
   an upper heat shield between said motor attachment assembly and said motor mount bracket.

2. The vehicular motor mount of claim 1 wherein said motor attachment assembly comprises:
   a cylindrical upper post with a first threaded through bore, having a top end with a first outer diameter region, a bottom end with a smaller, second outer diameter region, and a circular wear ring encircling said bottom end;
   a locating pin extending from a stopped orifice in a top face of said upper post;
   a cylindrical polymer bushing with a support plate imbedded therein, said support plate having a central orifice; and
   a cylindrical lower post with a second threaded through bore alignable with said first through bore, a stepped two diameter lower cylindrical section and an upper cylindrical section, separated by a capture flange;
   wherein said polymer bushing is sandwiched between said upper post and said lower post which are connected to said motor mount bracket with a threaded mechanical connector.

3. The vehicular motor mount of claim 2 wherein said frame attachment assembly comprises:
   a base plate having a planar top face, at least one threaded recess formed at a bottom face thereof, and a first series of orifices formed therethrough;
   a capture ring with a concave frustoconical body having a top surface with an internally facing flange extending inward therefrom, and a second series of threaded orifices formed on a bottom surface thereof that matingly align with said first series of orifices in said base plate; and
   wherein said base plate is connected to said capture ring by mechanical fasteners threadingly engaged through said first and second series of orifices therein forming a concave cavity.

4. The vehicular motor mount of claim 3 further comprising:
   a lower heat shield located between said bushing and said upper post.

5. The vehicular motor mount of claim 4 further comprising:
   a lower polymer bump stop located between said base plate and said lower post.

6. A vehicular motor mount connected between a vehicle's motor mount bracket and a vehicle's frame, comprising:
   a motor attachment assembly made of a sectional post made of a bolted connection between an upper peg and a lower peg;
   a polymer bushing with said lower peg imbedded therein; and at least one first mechanical fastener;
   wherein said upper peg has a top face with a threaded bore formed therein and bottom face with a set of threaded recesses therein;
   wherein said lower peg has an upper end and a lower end, with a capture flange extending perpendicularly from said upper end, said capture flange having a set of flow orifices formed therein for imbed attachment to said bushing, and a set of bolt orifices formed therethrough; and wherein said second mechanical fasteners pass through said bolt orifices and are mechanically engaged into said set of threaded recesses in said top peg;
   a frame attachment assembly having a base plate with a planar top face, at least one threaded recess formed at a bottom face thereof, and a series of orifices formed therethrough;
   a capture ring having a hollow frustoconical body having a top surface with an internally facing flange extending inward therefrom, and a series of threaded orifices formed on a bottom surface thereof that are matingly alignable with said series of orifices in said base plate;

at least one first mechanical fastener; and wherein said base plate is connected to said capture ring by said first mechanical fasteners passing through said series of orifices and threadingly engaged into said series of threaded orifices, forming a concave cavity therebetween; and wherein said proximal end of said motor attachment assembly is moveably captured within said cavity, and said cavity is similarly geometrically configured to house said proximal end of said housing.

* * * * *